United States Patent [19]

Blasi

[11] Patent Number: 4,909,555

[45] Date of Patent: Mar. 20, 1990

[54] COLLAPSIBLE ADJUSTABLE ANIMAL GAMBREL

[76] Inventor: Paul L. Blasi, 449 S. Robin Rd., Wichita, Kans. 67209

[21] Appl. No.: 321,844

[22] Filed: Mar. 10, 1989

[51] Int. Cl.⁴ .............................................. A22C 15/00
[52] U.S. Cl. ...................................... 294/79; 17/44.2; 294/81.21; 294/81.56
[58] Field of Search ................... 294/81.1, 81.2, 81.21, 294/81.3, 81.5, 81.56, 82.1, 79, 80; 17/44–44.3

[56] References Cited

U.S. PATENT DOCUMENTS

| | | | |
|---|---|---|---|
| 902,655 | 11/1908 | Heim | 294/79 |
| 1,020,843 | 3/1912 | Petersen | 294/79 |
| 1,030,683 | 6/1912 | Roskopf | 294/79 |
| 1,085,439 | 1/1914 | Knudson | 294/79 |
| 1,148,393 | 7/1915 | McGrath | 294/79 |
| 2,622,540 | 12/1952 | Stewart et al. | 294/81.56 X |
| 2,710,766 | 6/1955 | Erlewine | 294/79 |
| 4,027,357 | 6/1977 | Morris | 294/79 X |

Primary Examiner—Johnny D. Cherry
Attorney, Agent, or Firm—John W. Carpenter

[57] ABSTRACT

An adjustable animal gambrel having a pair of telescopic members. An impaling hook is slidably secured within an end of each of the pair of telescopic members. Each of the impaling hooks has a knob and an off-set eyelet. A retainer pin keeps the telescopic members from sliding with respect to each other.

3 Claims, 2 Drawing Sheets

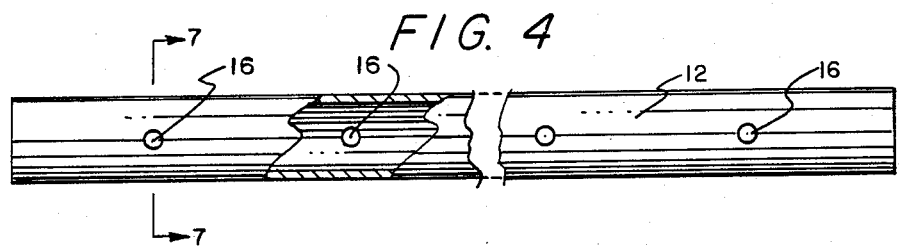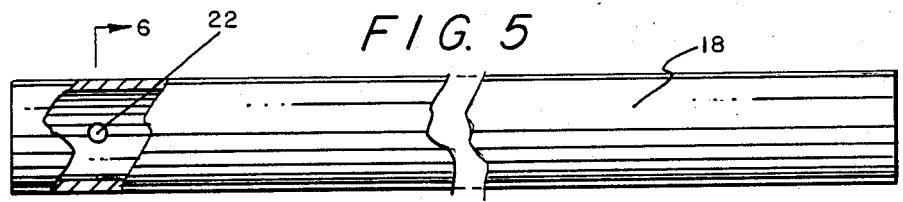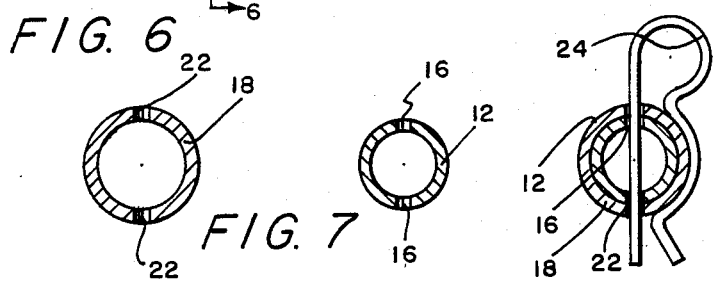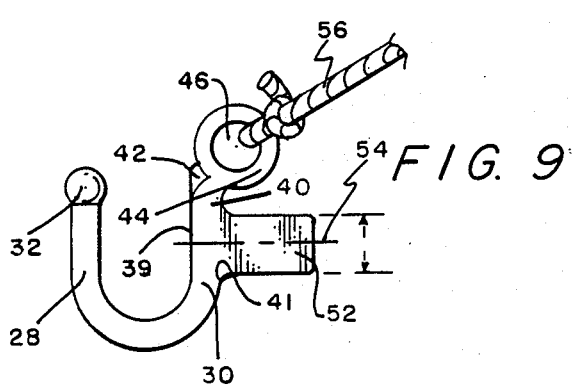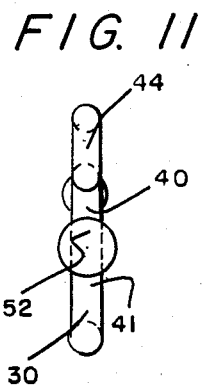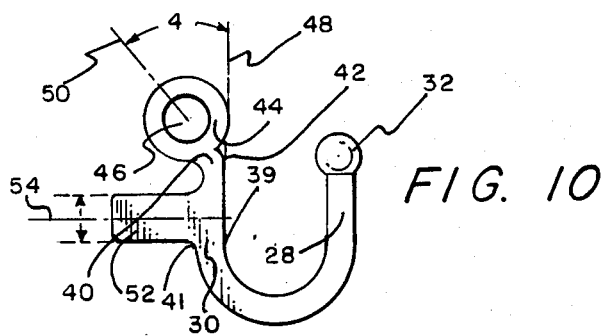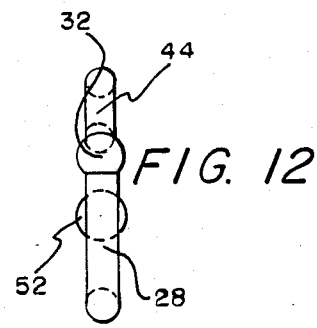

COLLAPSIBLE ADJUSTABLE ANIMAL GAMBREL

BACKGROUND OF THE INVENTION

1. Field of the Invention

This invention relates to animal dressing hooks which in the prior art have been overly complicated, heavy and bulky. Such hooks may be used for hanging slaughtered domestic animals and killed game. They are particularly desirable for hanging game carcasses out of reach of other wild animals in the field, for draining, ageing, and for work on the body.

2. Description of the Prior Art

A patentability investigation was conducted and the following U.S. patents were discovered: U.S. Pat. No. 1,020,843 to Petersen; No. 1,030,683 to Roskopf; No. 1,148,393 to McGrath; No. 1,150,331 to Borkhuis; No. 2,830,840 to Johnson; and U.S. Pat. No. 4,027,357 to Morris. None of the foregoing U.S. patents teach or suggest the particular gambrel of this invention.

SUMMARY OF THE INVENTION

The present invention accomplishes its desired objects by providing a collapsible adjustable animal gambrel. The animal gambrel has a first tubular telescopic member with a structure defining a first tubular open end and a plurality of first apertures. A second tubular telescopic member is telescopically engaged to the first tubular telescopic member and has a structure defining a second tubular open end and a plurality of second apertures that are capable of being aligned with the first apertures and receiving a retainer pin means for maintaining the first tubular telescopic member slidably affixed with the second tubular telescopic member. A retainer pin means slidably passes through one of the first apertures and one of the second apertures. A first inner arm has a first inside arm surface and a first outside arm surface, and a first outer arm is generally parallel with respect to the first inner arm. A first knob means is disposed at the end of the fist outer arm. The first inner arm includes a first structure that bends away from the first knob means and terminates in a first eyelet such that a plane along the first inside arm surface of the first inner arm forms an acute angle with a plane along the first structure and through the center of the first eye; a first lug means is secured integrally to the first outside arm surface and slidably disposed within said first tubular open end. A second impaling hook means is provided comprising a second inner arm with a second inside arm surface and a second outside arm surface and a second outer arm generally parallel with respect to the second inner arm. A second knob means is disposed at the end of the second outer arm. The second inner arm has a second structure that bends away from the second knob means and terminates in a second eyelet such that a plane along the second inside arm surface of the second inner arm forms an acute angle with a plane along the second structure and through the center o the second eyelet. A second lug means is secured integrally to the second outside arm surface and is slidably disposed within the second tubular open end. The collapsible adjustable animal gambrel additionally has a ring means, a first suspending member secured to the ring means and to the first eyelet, and a second suspending member secured to the ring means and to the second eyelet. A third suspending member is secured to the ring means which may be secured to and from a higher position.

It is therefore an object of the present invention to provide a collapsible adjustable animal gambrel.

This, together with the various ancillary objects and features which will become apparent to those skilled in the art as the following description proceeds, is attained by this novel gambrel, a preferred embodiment being shown with reference to the accompanying drawings, by way of example only, wherein:

BRIEF DESCRIPTION OF THE DRAWINGS

FIG. 4 is a partial top plan view of one of the telescopic tubular members;

FIG. 5 is a partial top plan view of the other telescopic tubular member;

FIG. 6 is a vertical sectional view taken in direction of the arrows and along the plane of line 6—6 in FIG. 5;

FIG. 7 is a vertical sectional view taken in direction of the arrows and along the plane of line 7—7 in FIG. 4;

FIG. 8 is a vertical sectional view taken in direction of the arrows and along the plane of line 8—8 in FIG. 2;

FIG. 9 is aside elevational view of one of the impaling hooks;

FIG. 10 is a side elevational view of the other impaling hook;

FIG. 11 is a front elevational view of the impaling hook of FIG. 9; and

FIG. 12 is a front elevational view of the impaling hook of FIG. 10.

Detailed Description of the Invention

Figure 1:
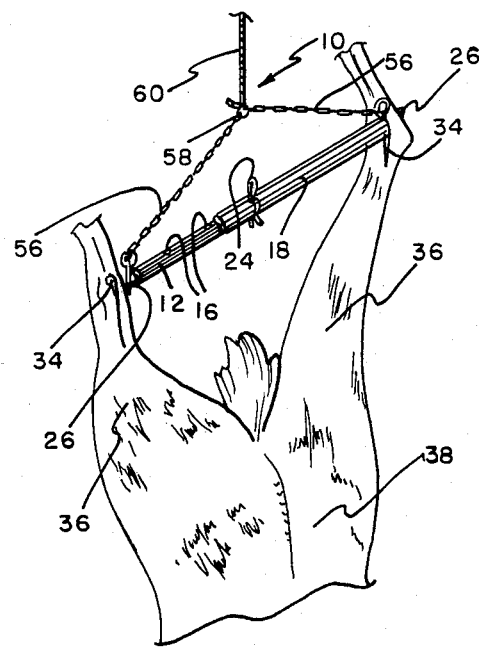
FIG. 1 is a perspective view of the adjustable animal gambrel engaged to hind quarters of an animal.

Referring in detail now to the drawings, there is seen the collapsible adjustable animal gambrel 10 comprising a tubular telescopic member 12 having an open end 14 and apertures 16 disposed along the structure thereof. Another tubular telescopic member 18 is provided with an open end 20 and apertures 22 disposed along the structure thereof. Member 12 is adapted to telescope within member 18, and apertures 16 are capable of being aligned with apertures 22 such that when a retainer pin 24 is slidably passed through a set of apertures 16 and 22 as best illustrated in FIG. 8, member 12 is affixed within member 18 and neither member can slide with respect to the other.

A pair of impaling hooks 26—26 is provided for being slidably lodged respectively within open end 14 and open end 20 of members 12 and 18 respectively. Each hook 26 has an outer arm 28 and an inner arm 30. Arms 28 and 30 are generally parallel with respect to each other. A knob 32 is disposed at the end of each of the outer arms 28 to protect the individual from being stuck or impaled. Hooks 26—26 still function as impaling hooks since hooks 26—26 would functionally be inserted into or through slits 34—34 (see FIG. 1) in hind legs 36—36 of an animal 38, such as a deer. The slits 34—34 would typically be accomplished by the individual using the gambrel 10.

Figure 2:
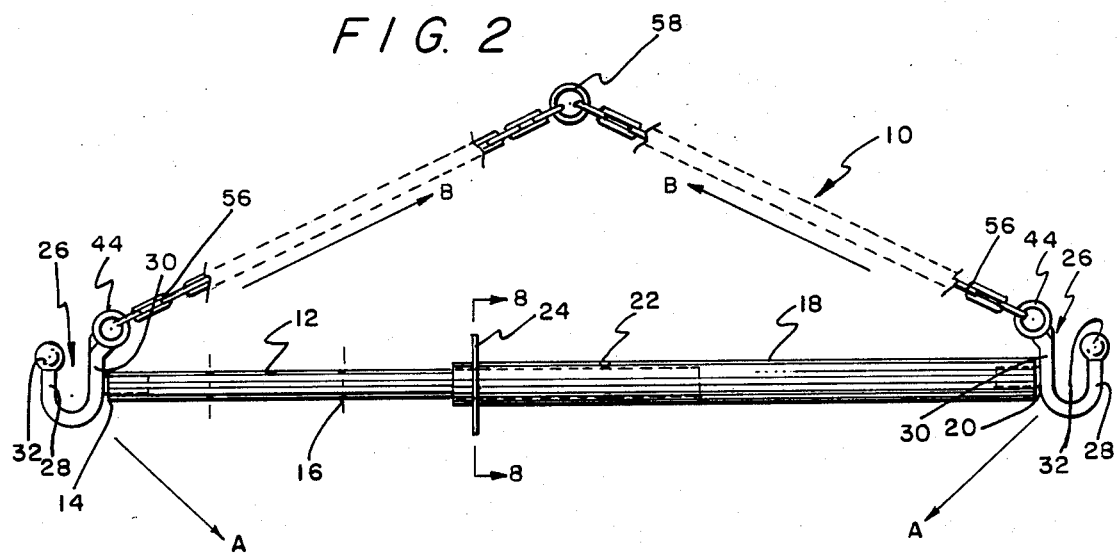
FIG. 2 is a front elevational view of the gambrel.
Figure 3:
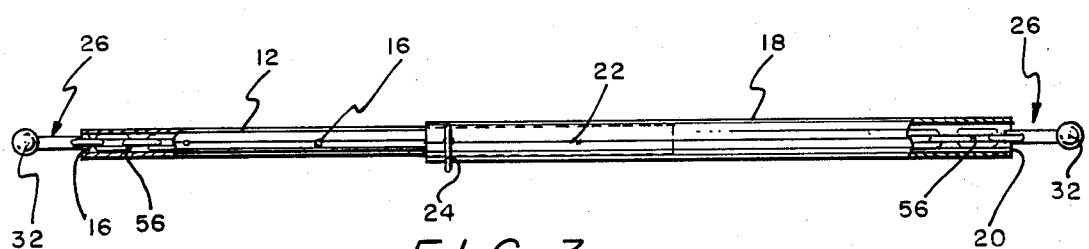
FIG. 3 is a top plan view of the gambrel.

Each of the inner arms 30 has an inside surface 39, an outside surface 41 and a structure 40 that bends away from the knob 32. The structure 40 has an inside planar surface 42 and terminates in an eyelet 44 with an eyelet center 46. A lug 52 is bound to each of the outside surfaces 41—41 and functions to slidably pass into the open ends 14 and 20. One of the salient features of the present invention is that the eyelets 44—44 are off-set with respect to a plane 48 (see FIG. 10) along the inside surface 39. More particularly, the angle L of a plane 50 along the inside planar surface 42 and through the eyelet center 46 is an acute angle L with respect to the plane 48. Angle L is preferably 30 to 45 degrees. Such an annular disposition of the eyelets 44—44 with respect to the inside surfaces 39—39 enables the lugs 52—52 to remain slidably straight within tee open ends 14 and 20. More specifically, assuming each lug 52 has a lug axis 54 (see FIGS. 9 and 10), such lug axis 54—54 would remain generally parallel with respect to the tubular members 12 and 18 by such off-set position of the eyelets 44—44. This would be partly due to the vector force from the weight of the animal 38 acting or pulling generally in the direction of the arrows A—A in FIG. 2, off-set or countermanded by the vector force directed in the direction of arrows B—B along suspending members 56—56 (which may be a chain, rope or the like) connected from the eyelets 44—44 to a common ring 58 that is engaged to another suspending member 60. Such acting vector forces have the tendency to force each lug 52 into the respective open ends (either 14 or 20) while maintaining the respective lug axis 54 generally parallel with respect to a horizontal plane, such as the tubular members 12 and 18. The lugs 52—52 are also kept smoothly straight within open ends 14 and 20 without being jammed upward, downward, or sideways to cause damage to either the lugs 52—52 and/or to the inside of the open ends 14 and 20 of the tubular members 12 and 18, respectively.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims, wherein various portions have been separated for clarity of reading and not for emphasis.

I claim:

1. A collapsible adjustable animal gambrel comprising a first tubular telescopic member having a structure defining a first tubular open end and a plurality of first apertures; a second tubular telescopic member telescopically engaged to the first tubular telescopic member and having a structure defining a second tubular open end and a plurality of second apertures that are capable of being aligned wit the first apertures and receiving a retainer pin means for maintaining the first tubular telescopic member slidably affixed within the second tubular telescopic member; a retainer pin means slidably passing through a first aperture and a second aperture; a first impaling hook means having a first inner arm with a first inside arm surface and a first outside arm surface, and a first outer arm generally parallel with respect to the first inner arm; a first knob means disposed at the end of said first outer arm; said first inner arm having a fist structure that bends away from the first knob means and terminates in a first eyelet such that a plane along the first inside arm surface of the first inner arm forms an acute angle with a plane along the first structure and through the center of the first eyelet; a first lug means secured integrally to the first outside arm surface and slidably disposed within said first tubular open end; a second impaling hook means having a second inner arm with a second inside arm surface and a second outside arm surface and second outer arm generally parallel with respect to the second inner arm; a second knob means disposed at the end of said second outer arm, said second inner arm having a second structure that bends away from the second knob means and terminates in a second eyelet such that a plane along the second inside arm surface of the second inner arm forms an acute angle with a plane along the second structure and through the center of the second eyelet; a second lug means secured integrally t the second outside arm surface and slidably disposed with said second tubular open end.

2. The collapsible adjustable animal gambrel of claim 1 additionally comprising a ring means, a first suspending member secured to said ring means and to said first eyelet, and a second suspending member secured to said ring means and to said second eyelet.

3. The collapsible adjustable animal gambrel of claim 2 additionally comprising a third suspending member secured to said ring means.

* * * * *